(12) United States Patent
Yamanashi

(10) Patent No.: US 6,342,975 B1
(45) Date of Patent: Jan. 29, 2002

(54) ZOOM LENS

(75) Inventor: Takanori Yamanashi, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/560,565

(22) Filed: Apr. 28, 2000

(30) Foreign Application Priority Data

Apr. 30, 1999 (JP) ............................................ 11-123625

(51) Int. Cl.$^7$ ........................... G02B 15/14; G02B 9/12; G02B 13/02
(52) U.S. Cl. ....................... 359/689; 359/791; 359/745; 359/748
(58) Field of Search .................. 359/689, 791, 359/745, 748

(56) References Cited

U.S. PATENT DOCUMENTS

| | | | |
|---|---|---|---|
| 4,773,744 A | | 9/1988 | Yamanashi .................. 359/689 |
| 6,043,939 A | * | 3/2000 | Toyama ...................... 359/689 |

\* cited by examiner

Primary Examiner—Georgia Epps
Assistant Examiner—Michael A. Lucas
(74) Attorney, Agent, or Firm—Pillsbury Winthrop LLP

(57) ABSTRACT

The object of the invention is to reduce the size of a camera by the provision of a zoom lens system which has a high zoom ratio and a small telephoto ratio at the wide-angle and telephoto end, and is simple in lens arrangement and reduced in size during lens collapsing. The zoom lens system comprises a positive first lens group G1, a positive second lens group G2 and a negative third lens group G3. For zooming from a wide-angle end to a telephoto end of the system, each lens group moves toward the object side while a spacing between the first lens group and the second lens group becomes wide and a spacing between the second lens group and the third lens group becomes narrow. The first lens group G1 comprises at least one set of a negative lens and a positive lens. The second lens group G2 includes an aperture stop and comprises at least one set of a negative lens and a positive lens. The third lens group G3 comprises one set of a positive lens and a negative lens. Specific conditions for an actual air space between the second and third lens groups G2 and G3, the focal length of the third group G3 and the zoom ratio shared by the third group G3 are all satisfied.

12 Claims, 10 Drawing Sheets

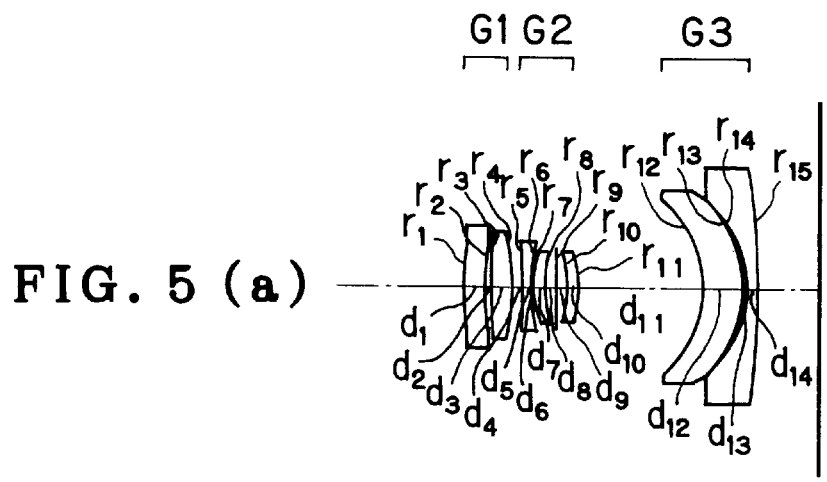
FIG. 5 (a)
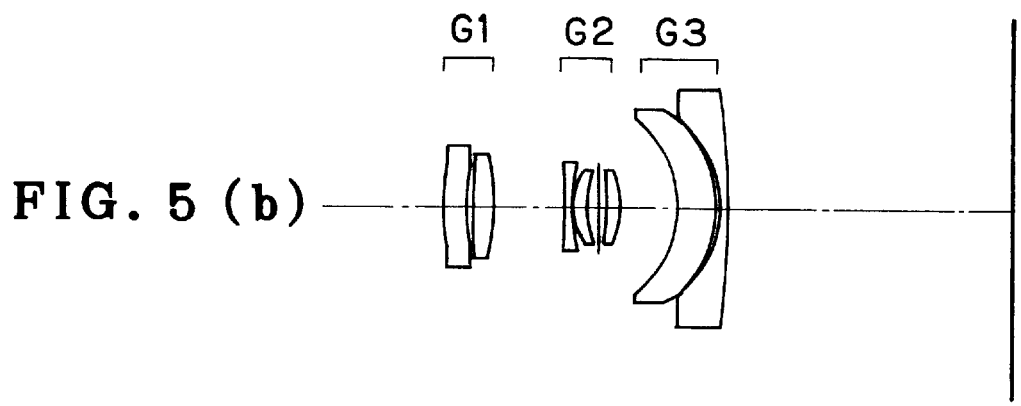
FIG. 5 (b)
FIG. 5 (c)
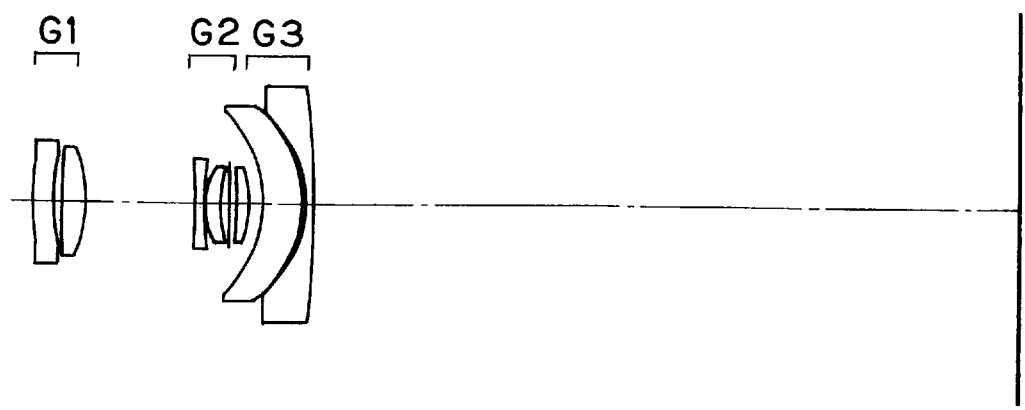

ZOOM LENS

BACKGROUND OF THE INVENTION

The present invention relates generally to a zoom lens, and more particularly to a zoom lens which, albeit having a high zoom ratio, has a small telephoto ratio at the telephoto end, and is relatively simple in lens arrangement and reduced in size during collapsing.

In U.S. Pat. No. 4,773,744, the applicant has already proposed one of so-called zoom lenses for compact cameras. This zoom lens system comprises three lens groups having positive, positive and negative refracting powers in order from the object side, with each lens group moving toward the object side for zooming to a long focus side. The zoom lens system has the shortest length at the wide-angle end and the longest length at the telephoto end. This system is characterized in that very high magnifications are achievable by increasing the amount of movement of the three lens groups. Since focusing is carried out by moving out the second lens group, the most stable image formation capabilities are obtainable. For size reductions, numerous proposal have been offered to make the most of aspherical surfaces. Also, proposals have been offered to use a radial type of GRIN lenses on the same arrangement base.

For similar three-group zoom lens system, it has been attempted to allocate a substantial aberration correction role to aspherical surfaces, thereby reducing the number of lenses that form one lens group.

Even with the state of the art in development of aspherical surf aces, however, the amount of zooming movement of each lens group is still large. Development of the technology for ensuring image formation capabilities and making the total length of a lens system considerably short is virtually untapped at present. Nor any satisfactory result is still obtained.

Most of current zoom lenses for compact cameras have a mechanism for retracting a zoom lens in a camera body irrespective of their zooming types. To this end, a lens collapsing mechanism is provided in a space at the wide-angle end where the zoom lens is longest, there by reducing the space. When the camera is actually in use, on the other hand, the zoom lens is used in its original lens arrangement. In the case of a high-magnification zoom lens, a lens mount becomes very long because the amount of zooming movement becomes large on the telephoto side, and this is combined with a shift of the center-of-gravity position, resulting in a decentration problem.

SUMMARY OF THE INVENTION

In view of such problems as mentioned above, an object of the invention is to provide a zoom lens system which, albeit having a high zoom ratio, has a small telephoto ratio not only at its wide-angle end but also at its telephoto end, and is relatively simple in lens arrangement and reduced in size during lens collapsing.

In order to accomplish the aforesaid object, the present invention provides a zoom lens system comprising, in order from an object side thereof, a first lens group having positive refracting power, a second lens group having positive refracting power and a third lens group having negative refracting power, characterized in that:

for zooming from a wide-angle end to a telephoto end of said system, each lens group moves toward said object side while a spacing between said first lens group and said second lens group becomes wide and a spacing between said second lens group and said third lens group becomes narrow, said first lens group comprises at least one set of a negative lens and a positive lens, said second lens group includes an aperture stop and comprises at least one set of a negative lens and a positive lens, said third lens group comprises one set of a positive lens and a negative lens, and conditions (1), (2) and (3) are satisfied:

$$0.25 < D_{2W}/d_l < 0.6 \quad (1)$$

$$0.03 < |f_3|/f_T < 0.25 \quad (2)$$

$$2.0 < \beta_{3T}/\beta_{3W} < 6.0 \quad (3)$$

where $D_{2W}$ is an actual air space between said second lens group and said third lens group at said wide-angle end, $d_l$ is a diagonal line length of an image plane of said zoom lens system that is a film or a diameter of an image circle, $f_3$ is a focal length of said third lens group, $f_T$ is a focal length of said zoom lens system at said telephoto end, $\beta_{3T}$ is a transverse magnification of said third lens group at said telephoto end, and $\beta_{3W}$ is a transverse magnification of said third lens group at said wide-angle end.

It is here preferable that the first lens group consists of, in order from the object side of the system, one negative lens having reduced refracting power and one positive lens, the second lens group consists of, in order from the object side, one negative lens, a positive lens having a strong curvature on an object side thereof, an aperture stop and one positive lens having a strong curvature on an image side thereof, and the third lens group consists of one positive lens convex on an image side thereof and one negative lens strongly concave on an object side thereof.

Preferably, lenses that forms the first lens group having positive refracting power have at least two aspherical surfaces so as to make correction for spherical aberration in at least a telephoto region of the zoom lens system.

Preferably, a positive lens or a negative lens that forms a part of the second lens group having positive refracting power has at least one aspherical surface so as to make correction for at least off-axis aberrations.

Preferably, a negative lens that forms a part of the third lens group having negative refracting power has an aspherical surface on a strong concave surface thereof on an object side thereof so as to make correction for a peripheral image plane in at least a wide-angle region of the zoom lens system.

Preferably, a positive lens that forms a part of the third lens group has at least two aspherical surfaces on its surface strongly concave on its image side so as to make correction for a peripheral image plane in at least a wide-angle region of the zoom lens system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 5(a) through 5(c) are views in section illustrating Example 5 of the zoom lens system according to the invention.

DESCRIPTION OF THE PREFERRED EMBODIMENTS

Figure 1:
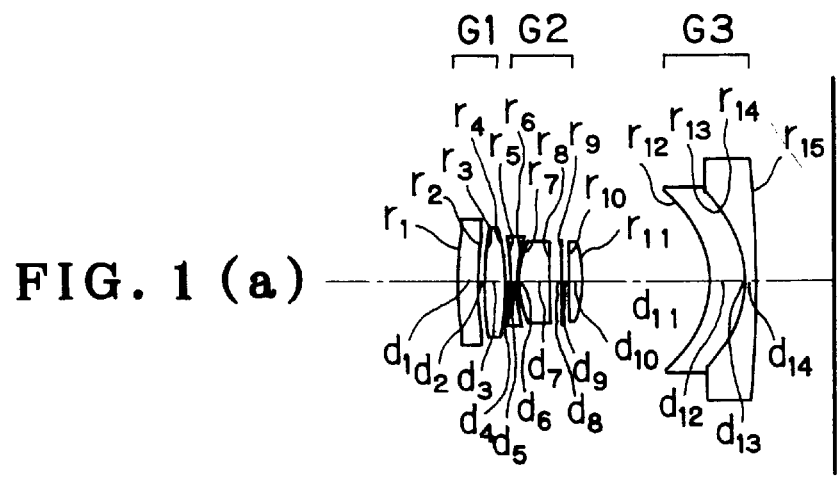
FIGS. 1(*a*) through 1(*c*) are views in section illustrating Example 1 of the zoom lens system according to the invention.
Figure 1:
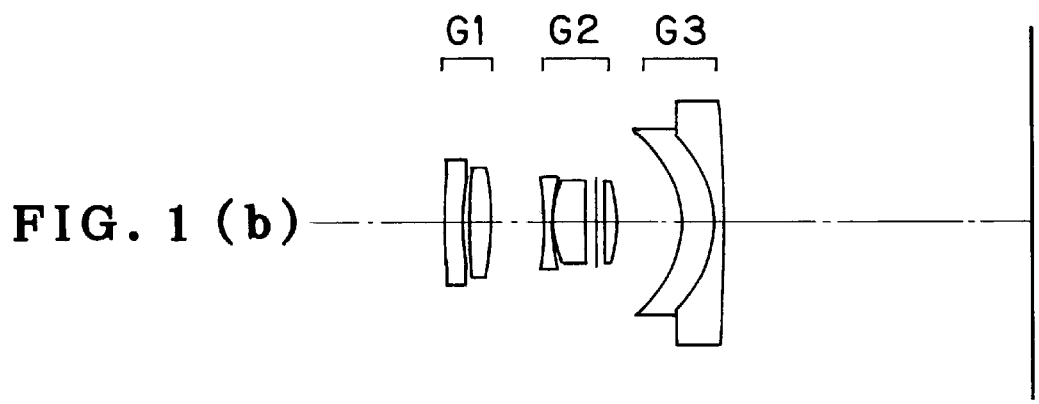
Figure 1:
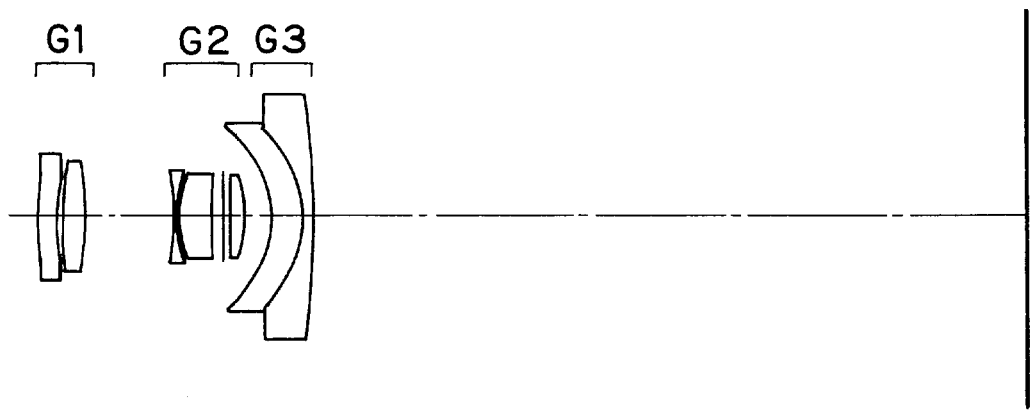

According to the present invention, the size of an optical system is so reduced that a lens unit with high zoom ratios can be housed in a small camera, thereby reducing the size of a conventional zoom compact camera.

So far, two-group type zoom lens systems have been used in relatively low-magnification applications and three-group type zoom lens systems have been currently in vogue for high-magnification uses. Some variations of these types are available; however, they result in an increased number of lens groups. To simplify the lens arrangement for each system, it has been proposed to reduce its aperture ratio at the telephoto end and make the most of an aspherical surface. Although this proposal makes it possible to reduce the size of the system at the wide-angle end and during lens collapsing, yet it is not preferable because the amount of zooming movement of the lens groups becomes large during zooming to the telephoto end.

The amount of movement is primarily dependent on the zoom ratio and the focal length of the zooming part. Therefore, if the amount of movement of the lens system is reduced with no modification thereto, the telephoto end then becomes short, ending up with a decrease in the zoom ratio itself. When a zoom lens system is constructed according to a paraxial design, accordingly, it is necessary to increase the zoom efficiency of the third lens group having negative refracting power, which is a main zooming part. This in turn enables the amount of zooming movement of the third lens group to be reduced. A problem in this case is that the powers of the lens groups become strong; that is, it is very difficult to maintain high image-formation capabilities by use of conventional means for correcting aberrations.

At the telephoto end in particular, it is required to reduce the telephoto ratio—which is a measure of size reductions—to some degrees. However, this makes correction of aberrations difficult, as well known in the art. In this case, it is required to find the best power profile, thereby achieving as simple lens construction as possible.

For this reason, the zoom lens system of the invention should be constructed as explained below. That is, the zoom lens system has a paraxial lens arrangement which comprises, in order from an object side of the system, a first lens group having positive refracting power, a second lens group having positive lens group and a third lens group having negative refracting power. For zooming from the wide-angle end to the telephoto end of the system, each lens group moves toward the object side while the spacing between the first and second lens groups becomes wide and the spacing between the second and third lens groups becomes narrow. The first to third lens groups are each in the form of a thick lens system; the first lens group comprises at least one set of a negative lens and a positive lens, the second lens group includes an aperture stop and comprises at least one set of a negative lens and a positive lens, and the third lens group comprises one set of a positive lens and a negative lens.

According to the present invention, it has now been found that a sufficiently large collapsing space is ensured by simplifying the lens arrangement to house it in a collapsible mount mechanism while the axial spacing between the second and third lens groups on a line of extension of the wide-angle end is narrowed from the normal wide-angle end. To this end, the following condition (1) should be satisfied.

$$0.25 < D_{2W}/d_1 < 0.6 \tag{1}$$

Here $D_{2W}$ is the actual air space between the second lens group and the third lens group at the wide-angle end, and $d_1$ is the diagonal line length of an image plane of the zoom lens system that is a film or the diameter of an image circle.

Any deviation from the lower limit of 0.25 in condition (1) is not preferred because the thickness of the camera becomes large. At greater than the upper limit of 0.6, the total length of the wide-angle end itself becomes long. Unless, in this case, the first and second lens groups are very simplified, the telephoto ratio at the wide-angle end becomes large. This is contrary to the purport of the present invention.

The zoom lens system of the present invention has the shortest length at the wide-angle end. Even when the zoom lens system is designed such that focusing is carried out at the wide-angle end, using the second lens group for instance, therefore, the amount of focusing movement becomes small, so that it is not necessary to make the marginal space between the first and second lens group larger than required, resulting in the achievment of efficient size reductions. Even when the spacing between the first and second lens groups becomes wide during zooming and so the amount of focusing movement becomes large, it is not required to take mechanical intereference into account. On the other hand, the sensitivity of the spacing between the second and third lens groups to the image plane tends to become high, and so it is required to ensure precision. To achieve high magnifications, the amount of movement of the zoom lens system should be reduced according to the following condition (2):

$$0.03 < |f_3|/f_T < 0.25 \tag{2}$$

Here $f_3$ is the focal length of the third lens group, and $f_T$ is the focal length of the zoom lens system at the telephoto end.

Condition (2) is important to reduce the length of the lens system at the telephoto end, i.e., the telephoto ratio. Any deviation from the lower limit of 0.03 may ensure a power profile favorable for size reductions because the focal length of the third lens group becomes very short. However, correction of aberrations becomes difficult. In addition, the number of lenses becomes larger than required. This is not preferable in view of size reductions. Exceeding the upper limit of 0.25 may be actually favorable for correction of aberrations. However, this is contrary to size reductions because of an increase in the amount of zooming movement.

In consideration of high magnifications, the contribute of the third lens group to zoom ratios is here defined by the following condition (3):

$$2.0 < \beta_{3T}/\beta_{3W} < 6.0 \qquad (3)$$

Here $\beta_{3T}$ is the transverse magnification of the third lens group at the telephoto end and $\beta_{3W}$ is the transverse magnification of the third lens group at the wide-angle end.

Condition (3) relates to making the magnification of the inventive zoom lens high, and gives a definition of the zoom ratio to be shared by the third lens group. Any deviation from the lower limit of 2.0 in condition (3) is contrary to the purport of the present invention, because the zoom range of the zoom lens system becomes as narrow as can be achieved by a more simplified zoom lens arrangement. At greater than the upper limit of 6.0, a paraxial solution may be obtained. However, it is difficult to achieve the necessary amount of zooming movement and maintain image formation capabilities.

Assume here that the power profile of each lens group is determined. Then, each lens group must have a proper lens arrangement. It is thus preferable that the first lens group is constructed of, in order from the object side of the system, one negative lens having reduced refracting power and one positive lens, the second lens group is constructed of, in order from the object side of the system, one negative lens, a positive lens having a strong curvature on its object side, an aperture stop and one positive meniscus lens having a strong curvature on its image side, and the third lens group is constructed of one positive lens convex on its image side and one negative lens having a strong concave surface on its object side. However, if the zoom lens system is allowed to have a smaller zoom ratio, it is then possible to construct the first lens group of one positive lens alone and the third lens group of one negative lens alone.

In consideration of image formation capabilities, the optimum lens arrangement must be taken into account. Indeed, however, it is understood that combinations of specific lens arrangements with optical elements are needed to maintain the image formation capabilities.

One requirement for the present invention is that the lens arrangement should be as simple as possible. By using at least one aspherical surface for the negative lens forming a part of the first lens group, it is possible to make better correction for spherical aberrations in a telephoto region. Through the present invention, however, it is now found that much higher performance can be achieved by using aspherical surfaces for both surfaces of the negative lens having reduced power. According to the present invention, the two lenses forming the first lens group may be constructed in the form of an air-spaced or cemented double.

Which type is selected may be determined while the overall lens arrangement, balances of correction of aberrations, decentration errors and sensitivity, etc. are taken into consideration. As shown in the examples set forth later, it is very favorable to use aspherical surfaces for both surfaces of the meniscus lens and an aspherical surface for one surface of the positive lens; it is possible to make much better correction for spherical aberrations. While the arrangement of the lens system varies more or less depending on where the aperture stop is positioned in the second lens group, it is noted that the first lens group should comprise at least one set of a positive lens and a negative lens.

It is also desired that at least one aspherical surface is used in the second lens group. While the effect on correction of aberrations varies depending on where the aspherical surface is used, it is noted that the use of the aspherical surface on the side of the second lens group nearest to the object side of the system has a great effect on correction of distortion and coma. When the second lens group is constructed of a negative lens and a positive lens, the use of the aspherical surface on the side of the second lens group nearest to the image side of the system is effective for correction of off-axis aberrations. The aspherical surface used herein is configured such that the amount of asphericity increases from the optical axis in an outward direction with respect to a reference spherical surface. Usually, there is no point of inflexion in the effective diameter. However, this is not always true and so depends on how aberrations are corrected throughout the system. That is, there is in some cases a point of inflexion in the effective diameter. In most cases, focusing is effected by moving out the second lens group as an integral piece, so that the amount of focusing movement can be reduced. However, it is desired to reduce the amount of residual aberrations by the second lens group itself. The aperture stop may be positioned on the object side of the second lens side, between adjacent lenses in the second lens group or in the rear of the second lens group. This in turn has an influence on the outer diameters of the first and third lens groups. It is here understood that the optimum lens arrangement for the second lens group varies depending on the position of the aperture stop. If the aperture stop is located between two positive lens in a concentric fashion as shown in the examples set forth later, it is then possible to make better correction for aberrations.

The arrangement of the third lens group that is important to put the present invention into practical use is now explained. It is desired that the third lens group be constructed of at least one positive lens and one negative lens having a strong concave surface on its object side. When the desired zoom ratio is low or the desired performance is not very severe, the lens arrangement of the third lens group should preferably be as simple as possible. To ensure the desired back focus at the wide-angle end, it is ideal that the third lens group can be constructed of one negative lens.

To maintain the peripheral image formation capability of the system on the wide-angle side, on the other hand, an aspherical surface or surfaces should be used for the aforesaid strong concave surface. It is thus possible to achieve an optical system that ensures image formation capabilities on the wide-angle side. In particular, the aspherical surface having a deep concave portion correlates with the peripheral performance of the system in the wide-angle region, and so it is desired that the aspherical surface be configured such that the amount of asphericity shows a minus increase with respect to the reference spherical surface from the optical axis in an outward direction. There may possibly be a point of inflection in the vicinity of the effective diameter.

In view of the foregoing considerations, the following requirements should be satisfied so as to achieve the optical system according to the present invention.

The first lens group having positive refracting power should have at least one aspherical surface therein. In particular, the use of an aspherical surface for the object side-surface of the positive lens having a strong convex surface on its object side has a great effect on correction of spherical aberrations on the telephoto side, the use of aspherical surfaces for both surfaces of the negative lens makes it possible to make much better correction for axial spherical aberration, the use of at least one aspherical surface in the second lens group having positive refracting power has a great effect on correction of off-axis aberrations, the use of an aspherical surface for a surface of the lens located on the image side of the second lens group, which surface is concave with respect to the aperture stop, has a great effect on correction of aberrations, and the use of at least one aspherical surface in the third lens group having negative refracting power and a slightly short focal length is greatly favorable. These requirements are needed so as to ensure the aberration correction capabilities of the optical system through their combinations. The use of aspherical surfaces for both surfaces of the positive lens in particular has a great effect on correction of field curvature at the wide-angle end of the system. For correction of spherical aberrations, it is very important to make effective use of an aspherical surface in the first lens group, and for ensuring a flat image plane in the wide-angle region, it is very important to make effective use of an aspherical surface in the third lens group. By the incorporation of a lens sub-group for controlling field curvature in the second lens group it is expected to obtain higher performance. The third lens group is expected to have a great effect, for instance, when aspherical surfaces are used for both surfaces of the positive lens or an aspherical surface is used for the strong concave surface of the negative second lens. When the aspherical surface is used for the image side-surface of the negative lens, too, such a great effect is expectable.

The present invention will now be explained with reference to Examples 1 to 5.

EXAMPLE 1

Example 1 is directed to a zoom lens system having a focal length of 38.9 to 145.15 mm and an aperture ratio of 1:4.62 to 12.75. FIGS. 1(a), 1(b) and 1(c) are illustrative of the lens arrangement of the zoom lens system. More illustratively, FIGS. 1(a), 1(b) and 1(c) are sectional views of the zoom lens system at its wide-angle end (a), its intermediate position (b) and its telephoto end (c), respectively. This also holds for Examples 2 to 5.

Referring to the lens arrangement of this example, the first lens group G1 consists of a negative meniscus lens that is convex on its object side and has reduced power and a double-convex positive lens. Three aspherical surfaces are used, two for both surfaces of the first lens in the first lens group G1 and one for the object side-surface of the second lens. The second lens group G2 consists of a double-concave negative lens, a double-convex positive lens, an aperture stop and a positive meniscus lens convex on its image side. One aspherical surface is used for the surface, opposite to the aperture stop, of the second lens in the second lens group G2. The third lens group G3 consists of a positive meniscus lens having reduced power, which lens is concave on its object side with aspherical surfaces used for both its surfaces, and a negative meniscus lens concave on its object side. For the deep concave surface of the negative meniscus lens, too, an aspherical surface is used.

The zoom lens system of this example is made up of seven lenses in all, and the first and third lens groups G1 and G3 are each characterized by including one lens having a very weak power and having aspherical surfaces on both its surfaces.

Figure 6:
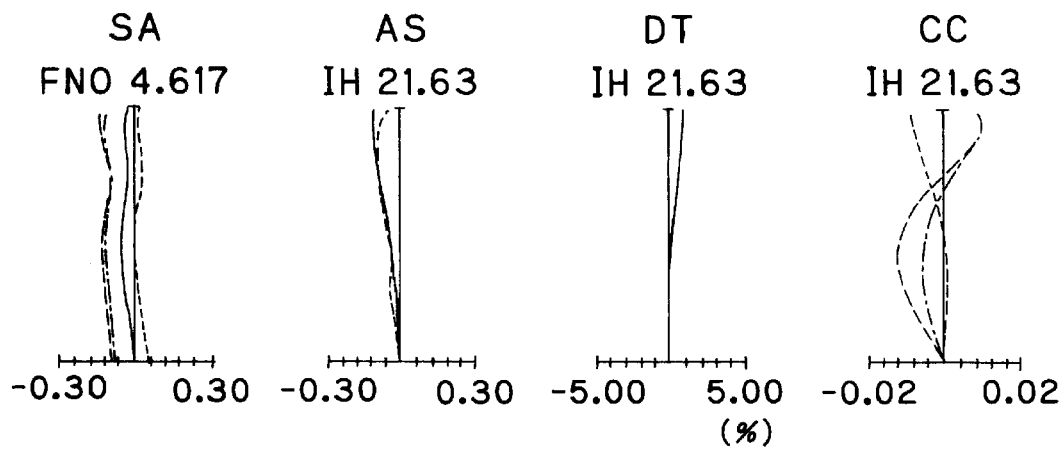
FIGS. 6(a) through 6(c) are aberration diagrams for Example 1 of the zoom lens system according to the invention.
Figure 6:
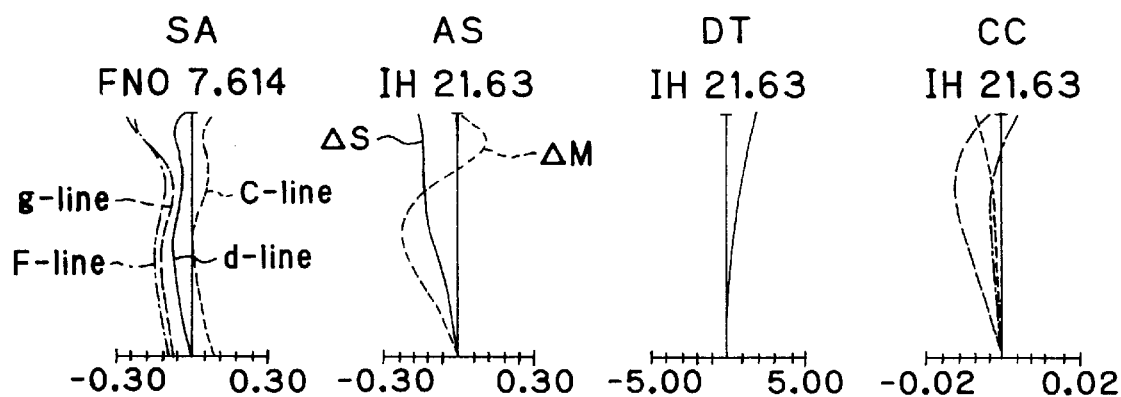
Figure 6:
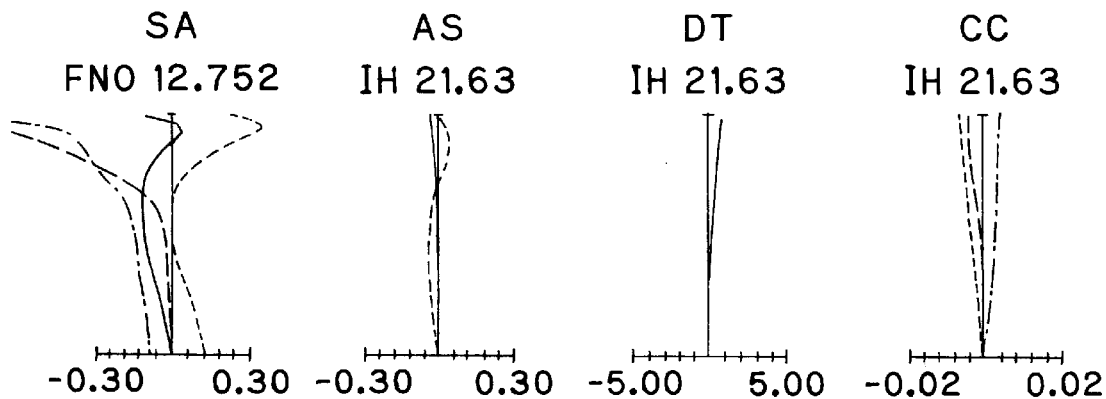

As can be predicted from the aberration diagrams of FIGS. 6(a), 6(b) and 6(c), the optical system of this example can make satisfactory correction for aberrations with a reduced number of lenses. FIGS. 6(a), 6(b) and 6(c) are illustrative of spherical aberration SA, astigmatism AS, distortion DT and chromatic aberration of magnification CC at the wide-angle end (a), intermediate position (b) and telephoto end (c), respectively. In these drawings, "IH" is an abbreviation of image height. This also holds for Examples 2 to 5.

EXAMPLE 2

Figure 2:
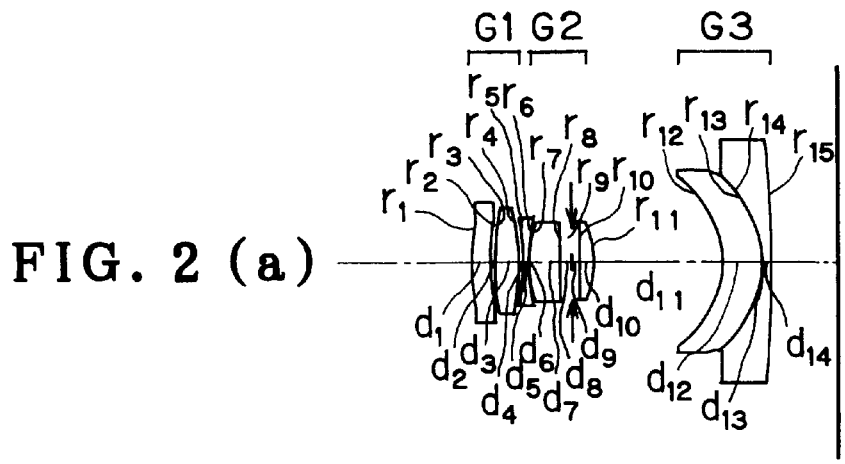
FIGS. 2(a) through 2(c) are views in section illustrating Example 2 of the zoom lens system according to the invention.
Figure 2:
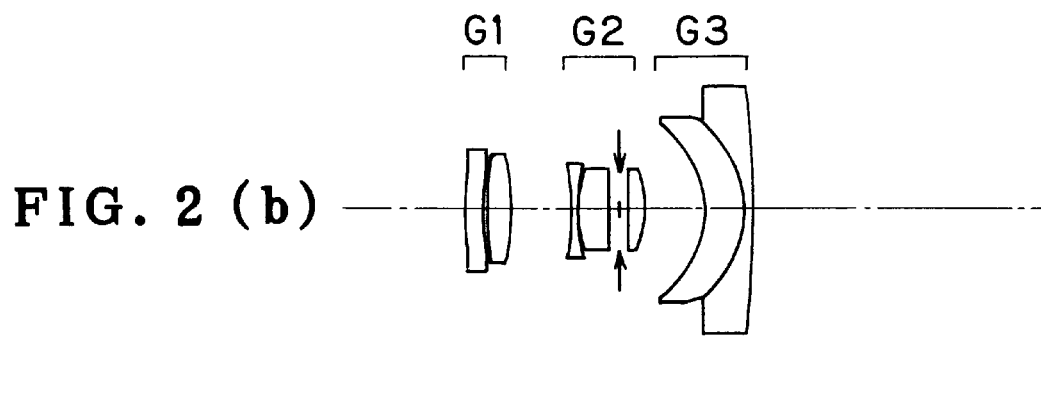
Figure 2:
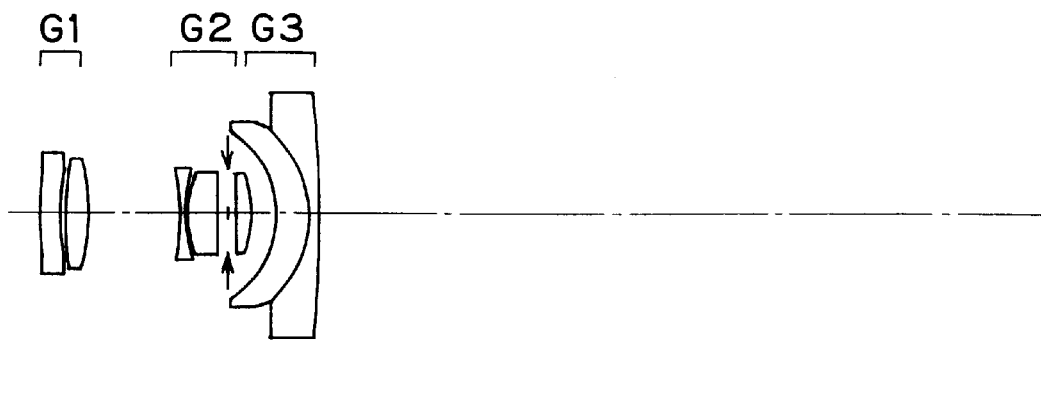

Example 2 is directed to a zoom lens system having a focal length of 38.9 to 155.1 mm and an aperture ratio of 1:4.59 to 13.61. FIGS. 2(a), 2(b) and 2(c) are illustrative of the lens arrangement of the zoom lens system.

Figure 7:
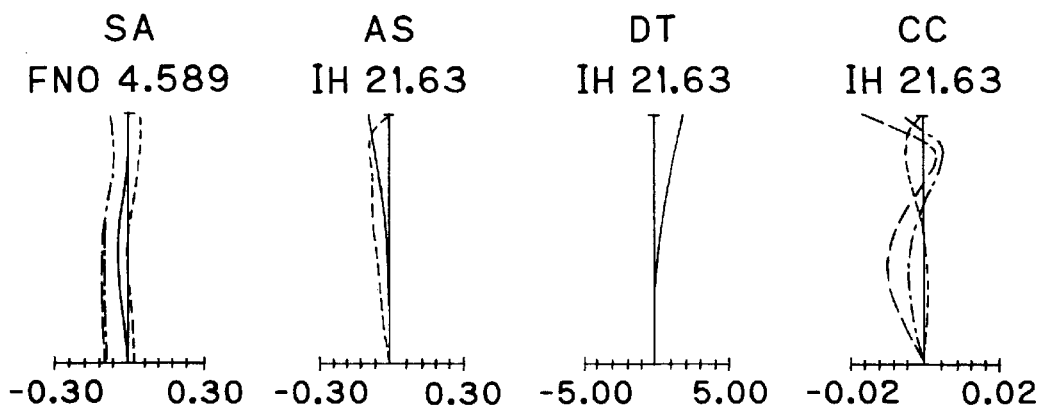
FIGS. 7(a) through 7(c) are aberration diagrams for Example 2 of the zoom lens system according to the invention.
Figure 7:
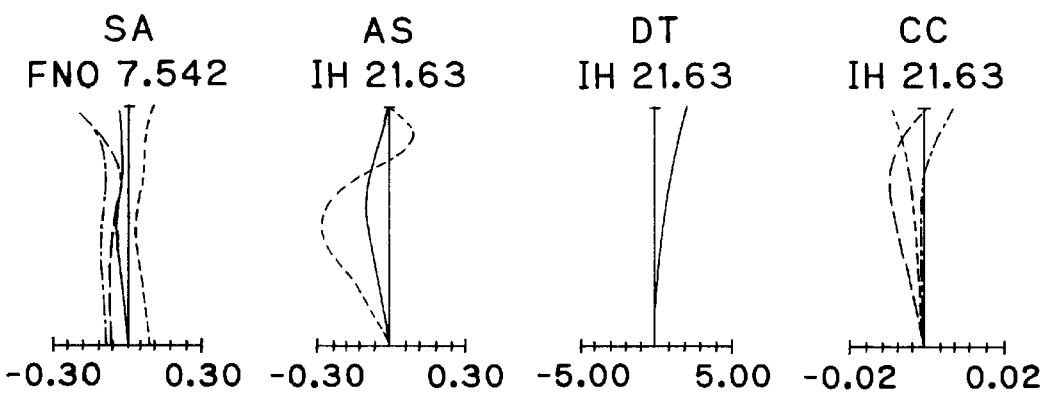
Figure 7:
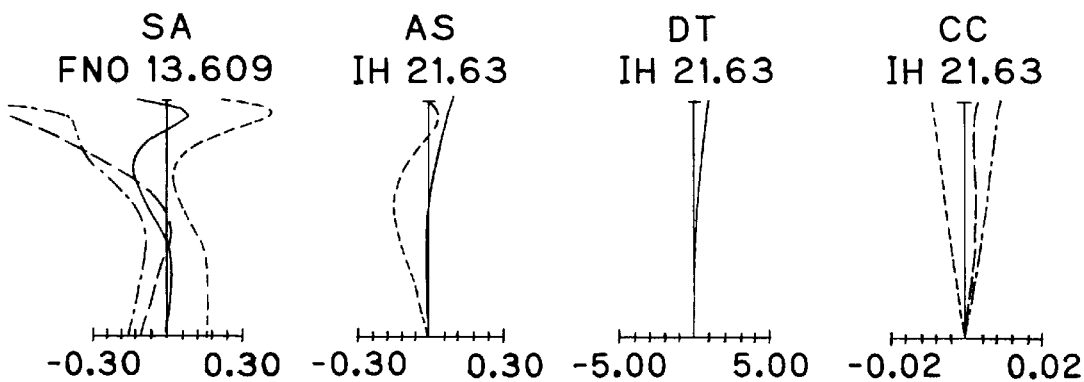

The lens arrangement of this example is almost similar to that of Example 1. The first lens group G1 consists of a negative meniscus lens that is convex on its object side and has reduced power and a double-convex positive lens. Three aspherical surfaces are used, two for both surfaces of the first lens in the first lens group G1 and one for the object side-surface of the second lens. The second lens group G2 consists of a double-concave lens, a double-convex lens, an aperture stop and a positive meniscus lens convex on its image side. An aspherical surface is used for the surface, opposite to the aperture stop, of the second lens in the second lens group G2. The third lens group G3 consists of a meniscus lens having reduced power, which lens is concave on its object side with aspherical surfaces used for both its surfaces, and a negative meniscus lens concave on its object side. For the deep concave surface of the negative meniscus lens, too, an aspherical surface is used. FIGS. 7(a), 7(b) and 7(c) are the aberration diagrams for this example.

EXAMPLE 3

Figure 3:
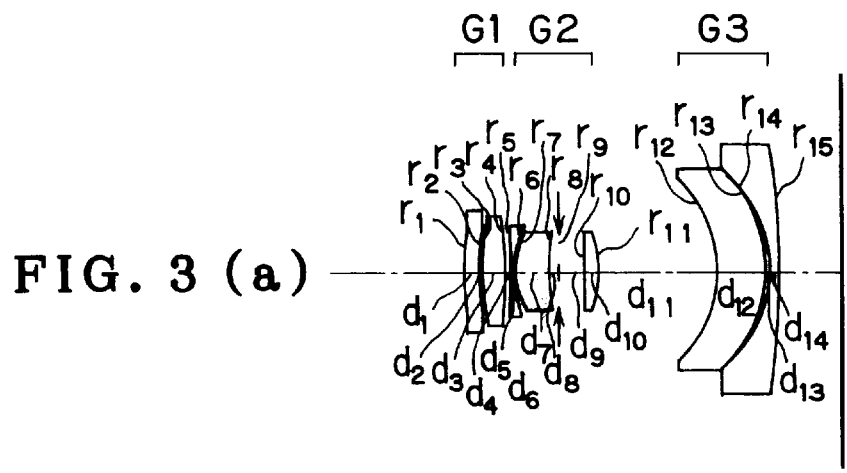
FIGS. 3(a) through 3(c) are views in section illustrating Example 3 of the zoom lens system according to the invention.
Figure 3:
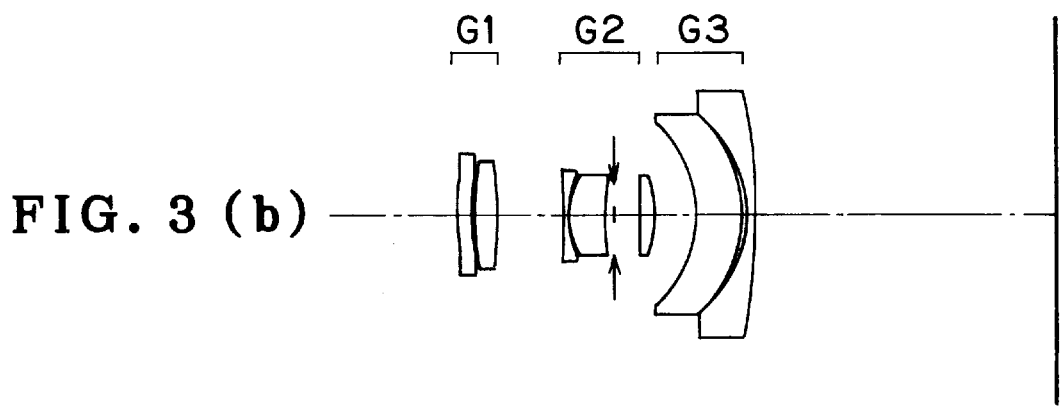
Figure 3:
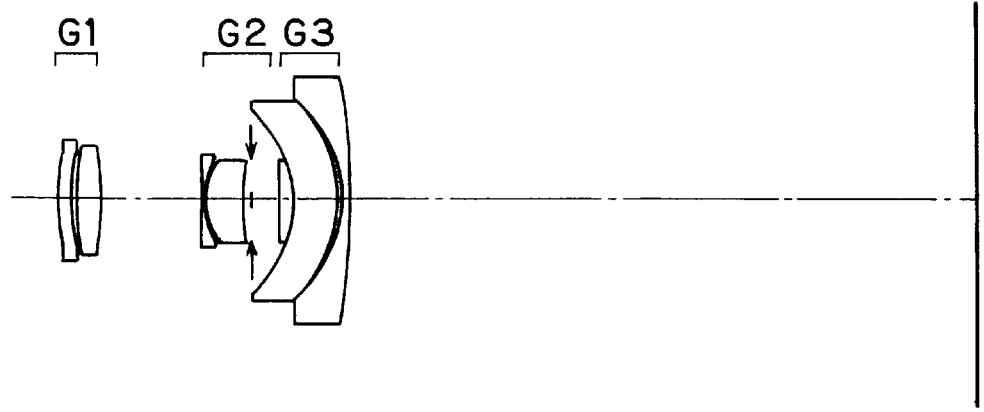

Example 3 is directed to a zoom lens system having a focal length of 38.9 to 131 mm and an aperture ratio of 1:4.42 to 11.46. FIGS. 3(a), 3(b) and 3(c) are illustrative of the lens arrangement of the zoom lens system.

Figure 8:
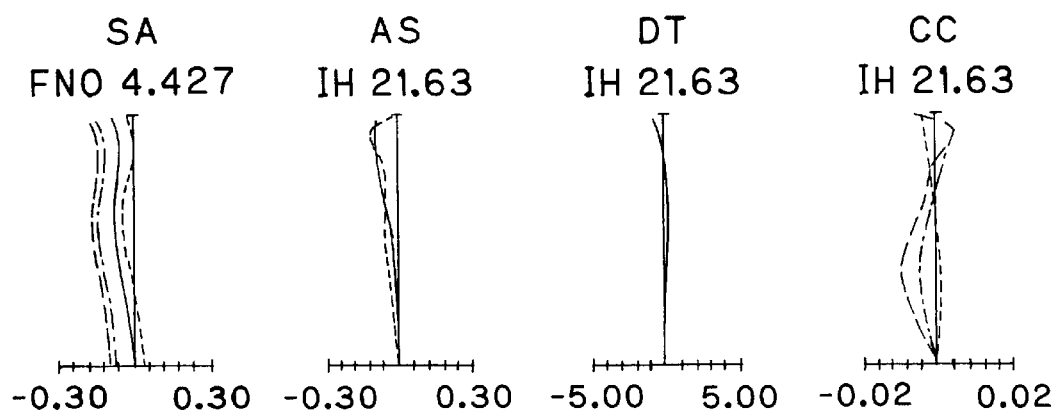
FIGS. 8(a) through 8(c) are aberration diagrams for Example 3 of the zoom lens system according to the invention.
Figure 8:
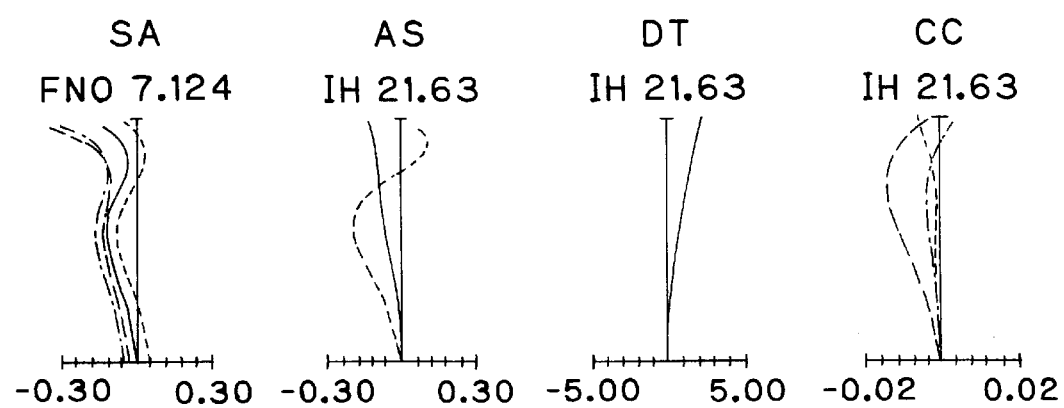
Figure 8:
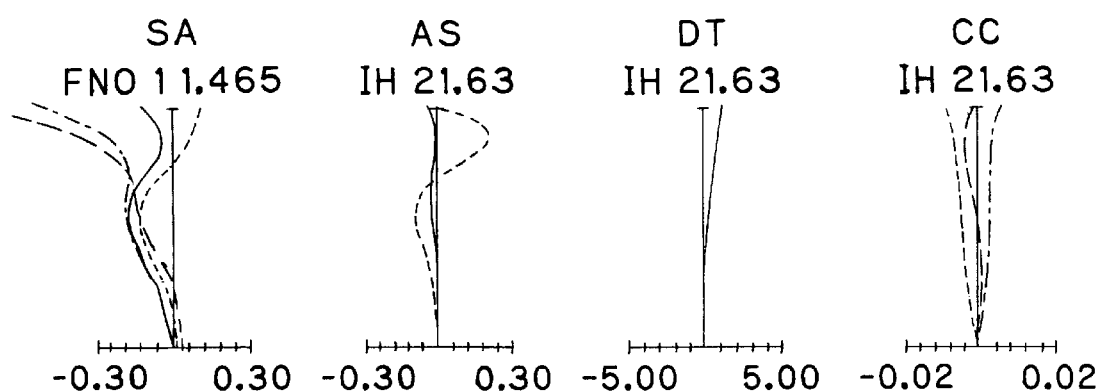

Referring to the lens arrangement of this example, the first lens group G1 consists of a negative meniscus lens that is convex on its object side and has reduced power and a double-convex positive lens. Three aspherical surfaces are used, two for both surfaces of the first lens in the first lens group G1 and one for the image side-surface of the second lens. The second lens group G2 consists of a double-concave lens, a positive meniscus lens convex on its object side, an aperture stop and a double-convex positive lens. An aspherical surface is used for the surface, opposite to the aperture stop, of the second lens in the second lens group G2. The third lens group G3 consists of a meniscus lens having reduced power, which lens is concave on its object side with aspherical surfaces used for both its surfaces, and a negative meniscus lens concave on its object side. For the deep concave surface of the negative meniscus lens, too, an aspherical surface is used. FIGS. 8(a), 8(b) and 8(c) are the aberration diagrams for this example. This example has a zoom ratio lower than Examples 1 and 2 have.

EXAMPLE 4

Figure 4:
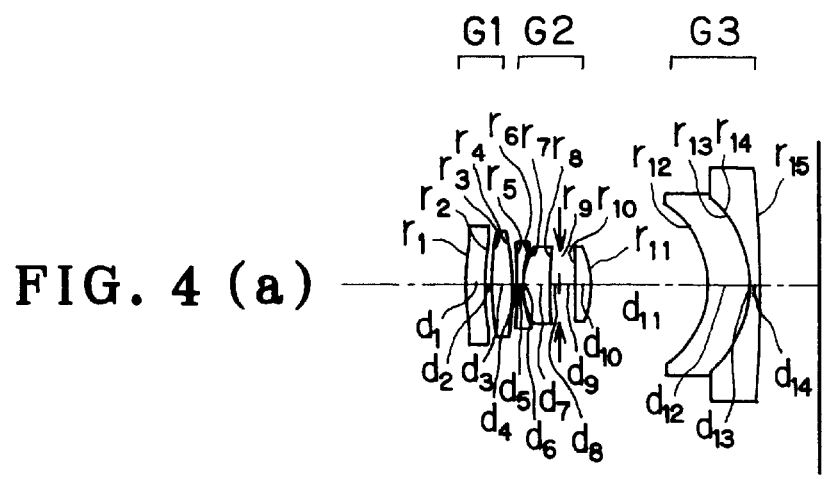
FIGS. 4(a) through 4(c) are views in section illustrating Example 4 of the zoom lens system according to the invention.
Figure 4:
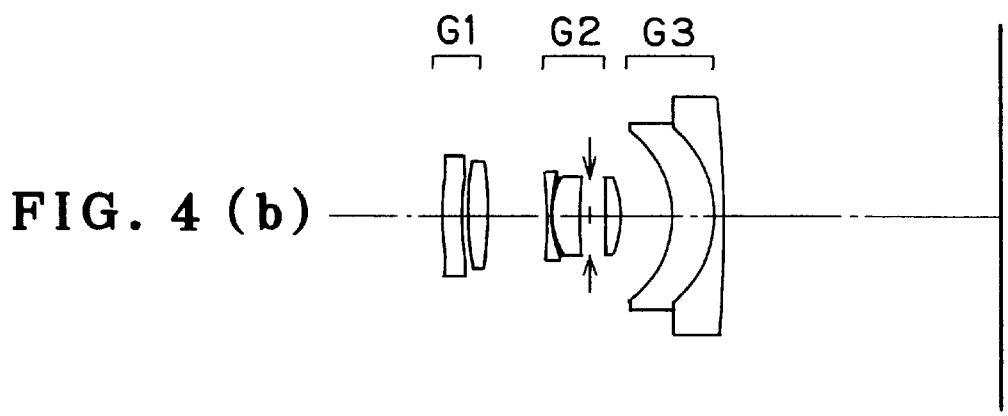
Figure 4:
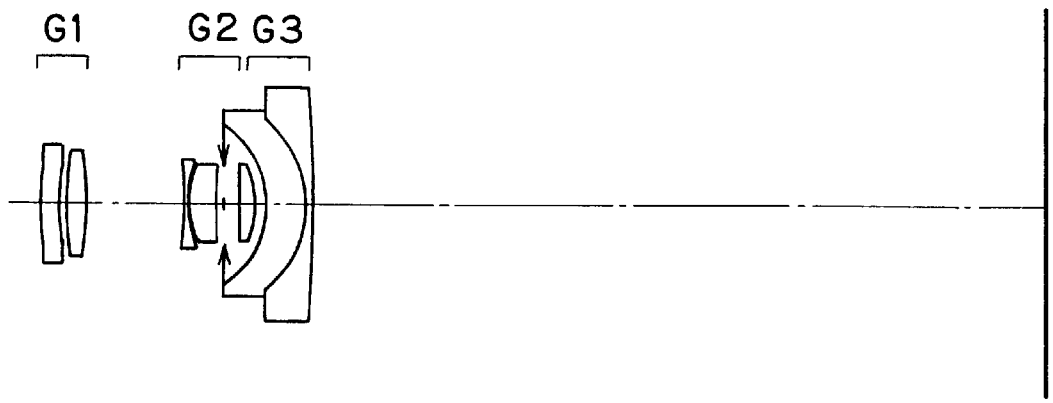

Example 4 is directed to a zoom lens system having a focal length of 38.9 to 164 mm and an aperture ratio of 1:4.47 to 14.42. FIGS. 4(a), 4(b) and 4(c) are illustrative of the lens arrangement of the zoom lens system.

In this example, four aspherical surfaces are used, two for both surfaces of a negative lens in the first lens group G1, which lens has reduced power, and two for both surfaces of a lens in the third lens group G3, which lens has reduced power, as in Examples 1 to 3, thereby making it possible to make satisfactory correction for longitudinal spherical aberration, distortion and field curvature. This is one of the noticeable features of the present invention.

Figure 9:
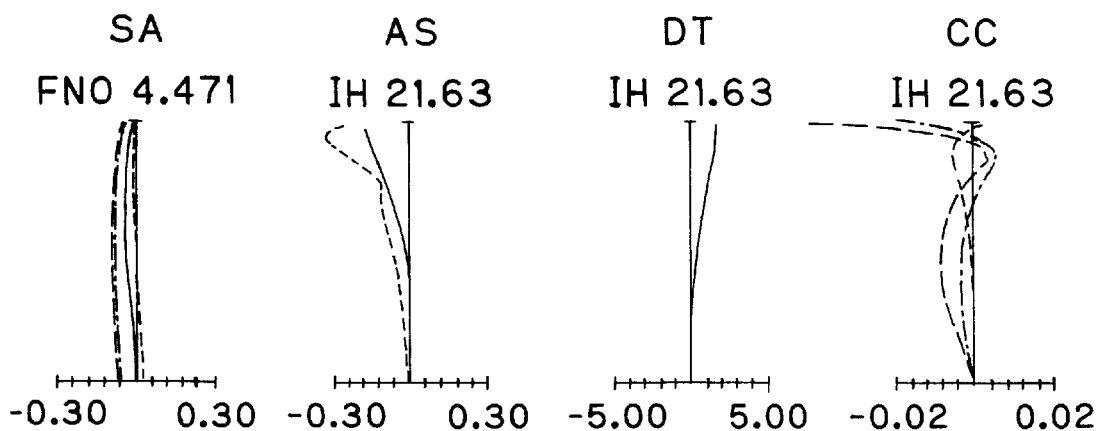
FIGS. 9(a) through 9(c) are aberration diagrams for Example 4 of the zoom lens system according to the invention.
Figure 9:
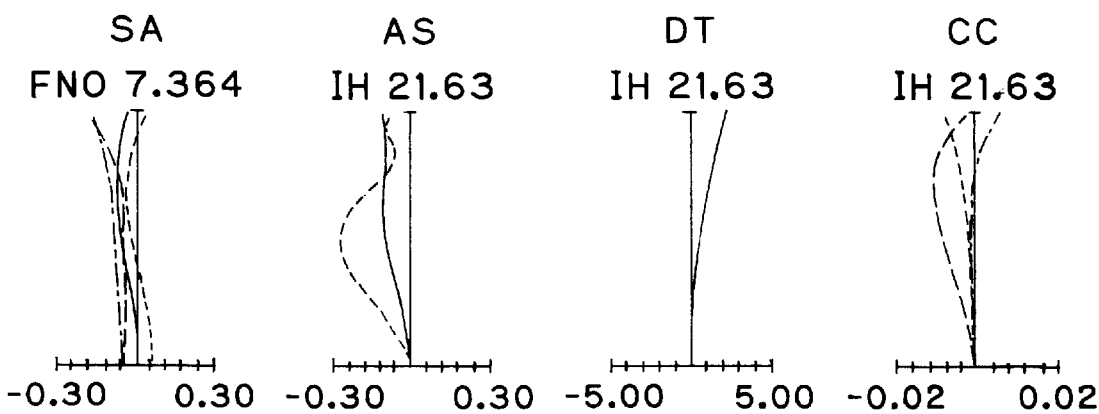
Figure 9:
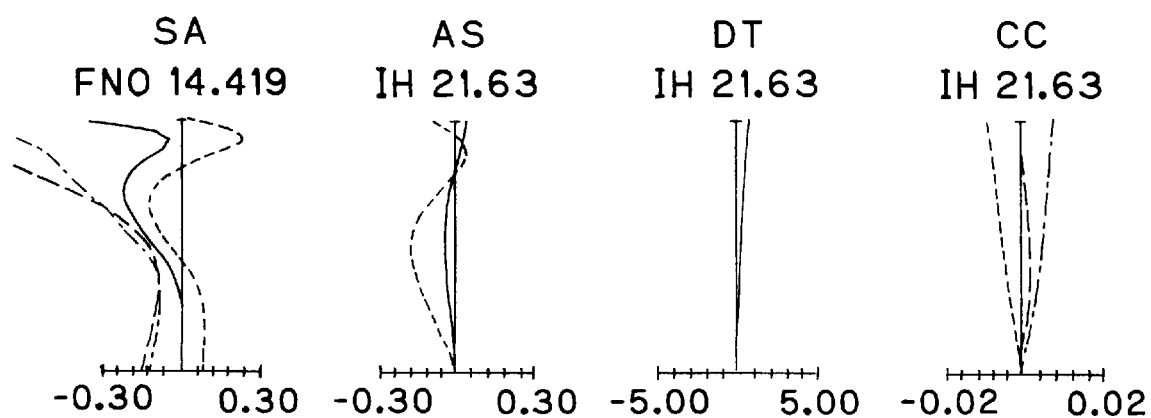

More specifically, the first lens group G1 consists of a negative meniscus lens having reduced power, which lens is convex on its object side, and a double-convex positive lens. Three aspherical surfaces are used, two for both surfaces of the first lens in the first lens group G1 and one for the object side-surface of the second lens. The second lens group G2 consists of a double-concave negative lens, a positive meniscus lens convex on its object side, an aperture stop and a positive meniscus lens convex on its image side. An aspherical surface is used for the surface, opposite to the aperture stop, of the second lens in the second lens group G2. The third lens group G3 consists of a meniscus lens having reduced power, which lens is concave on its object side with aspherical surfaces used for both its surfaces, and a negative meniscus lens concave on its object side. For the deep concave surface of the second negative meniscus lens, too, an aspherical surface is used. FIGS. 9(a), 9(b) and 9(c) are the aberration diagrams for this example. As can be predicted from FIGS. 4(a), 4(b) and 4(c), at the wide-angle end of the system, the total lengths of the first and second lens groups G1 and G2 are short and the air separation between the second and third lens groups G2 and G3 is large, so that a sufficiently large collapsible mount space can be ensured.

EXAMPLE 5

Example 5 is directed to a zoom lens system having a focal length of 38.9 to 150.36 mm and an aperture ratio of 1:4.87 to 13.13. FIGS. 5(a), 5(b) and 5(c) are illustrative of the lens arrangement of the zoom lens system.

In this example, additional four aspherical surfaces are used, one for the object side-surface of the first negative lens in the second lens group G2, two for both surfaces of the positive second lens, and one for the image side-surface of the third lens. More aspherical surfaces are used to provide an optical system which has very superior optical performance with a very simple arrangement. In this connection, technologies for fabricating such aspherical surfaces at lower costs are in great demand.

Figure 10:
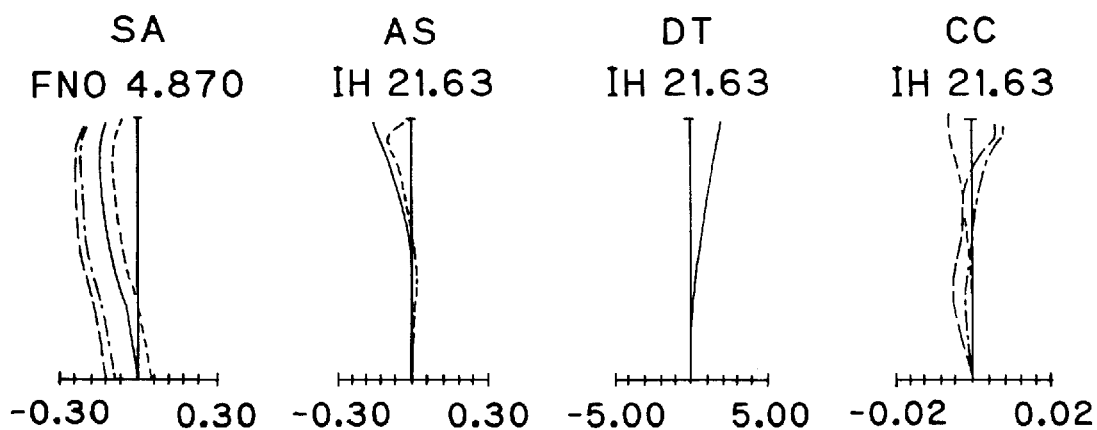
FIGS. 10(a) through 10(c) are aberration diagrams for Example 5 of the zoom lens system according to the invention.
Figure 10:
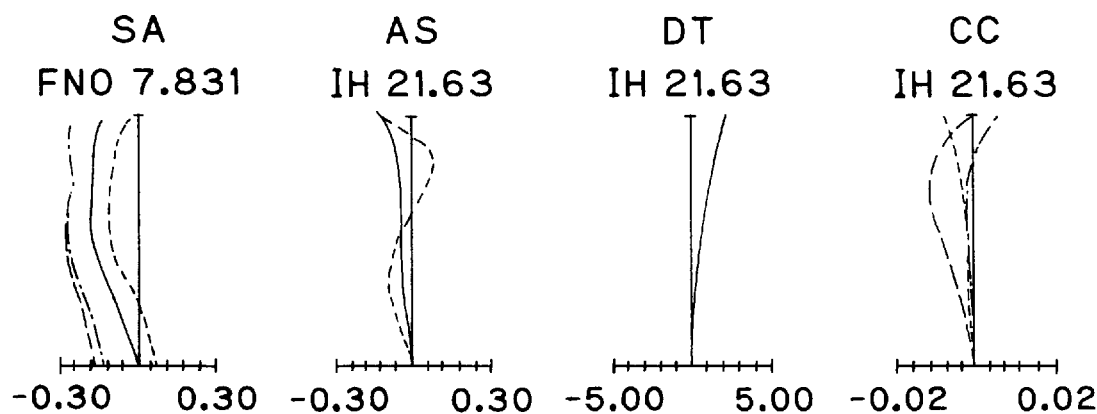
Figure 10:
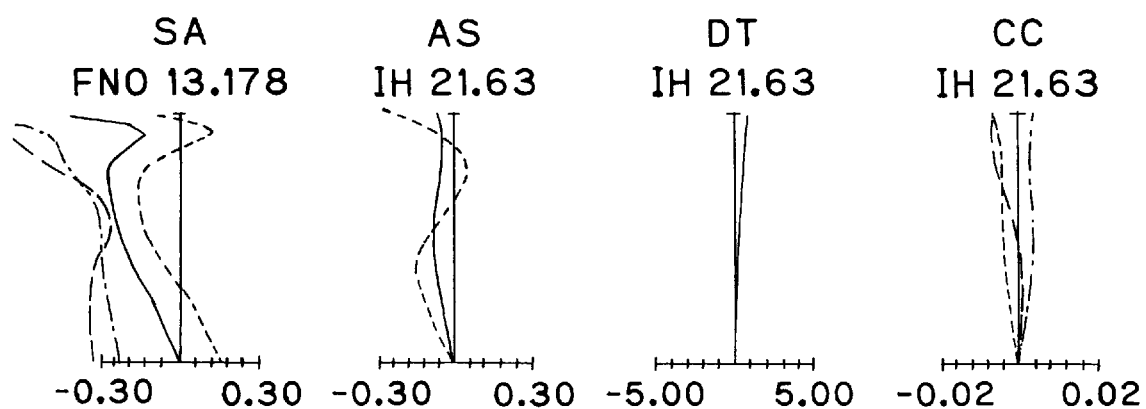

More specifically, the first lens group G1 consists of a negative meniscus lens having reduced power, which lens is convex on its object side, and a double-convex positive lens. Three aspherical surfaces are used, two for both surfaces of the first lens in the first lens group G1 and one for the object side-surface of the second lens. The second lens group G2 consists of a double-concave negative lens, a positive meniscus lens convex on its object side, an aperture stop and a positive meniscus lens convex on its image side. Four aspherical surfaces are used, on for the object side-surface of the first lens in the second lens group G2, two for both surfaces of the second lens and one for the image side-surface of the third lens. The third lens group G3 consists of a meniscus lens having reduced power, which lens is concave on its object side with aspherical surfaces used for both its surfaces, and a negative meniscus lens concave on its object side. For the deep concave surface of the second negative meniscus lens, too, an aspherical surface is used. FIGS. 10(a), 10(b) and 10(c) are the aberration diagrams for this example.

Numerical data for each example are set out below. The symbols used hereinafter but not hereinbefore have the following meanings.

f: the focal length of the zoom lens system, $F_{NO}$: F-number, $f_B$: back focus, $r_1, r_2, \ldots$: the radius of curvature of each lens surface, $d_1, d2, \ldots$: the separation between adjacent lens surfaces, $n_{d1}, n_{d2}, \ldots$: the d-line index of refraction of each lens, and $\nu_{d1}, \nu_{d2}, \ldots$: the Abbe's number of each lens. Here let x signify an optical axis provided that the direction of propagation of light is positive and y signify a direction perpendicular to the optical axis. Then, aspherical configuration is given by:

$$x=(y^2/r)/\{1+\{1-(K+1)(y/r)^2\}^{1/2}\}+A_4 y^4+A_6 y^6+A_8 y^8+A_{10} y^{10}$$

Here r is a paraxial radius of curvature, K is a conical coefficient, and $A_4$, $A_6$, $A_8$ and $A_{10}$ are the 4th, 6th, 8th and 10th aspherical coefficients, respectively.

Example 1 f = 38.900~76.100~145.150  
$F_{NO}$ = 4.617~7.614~12.752  
$f_B$ = 9.202~34.505~80.097

| | | | | |
|---|---|---|---|---|
| $r_1$ = 22.9157 (Aspheric) | $d_1$ = 2.2304 | $n_{d1}$ = 1.72916 | $\nu_{d1}$ = 54.68 |
| $r_2$ = 20.4736 (Aspheric) | $d_2$ = 0.5548 | | |
| $r_3$ = 52.4437 (Aspheric) | $d_3$ = 2.7000 | $n_{d2}$ = 1.49700 | $\nu d_2$ = 81.54 |
| $r_4$ = −26.6843 | $d_4$ = (Variable) | | |
| $r_5$ = −26.2707 | $d_5$ = 0.4600 | $n_{d3}$ = 1.76200 | $\nu_{d3}$ = 40.10 |
| $r_6$ = 16.1652 | $d_6$ = 0.1000 | | |
| $r_7$ = 11.1078 | $d_7$ = 3.7689 | $n_{d4}$ = 1.63930 | $\nu_{d4}$ = 44.87 |
| $r_8$ = −374.8801 (Aspheric) | $d_8$ = 1.2500 | | |
| $r_9$ = ∞ (Stop) | $d_9$ = 0.8500 | | |
| $r_{10}$ = −102.9183 | $d_{10}$ = 1.6500 | $n_{d5}$ = 1.48749 | $\nu_{d5}$ = 70.23 |
| $r_{11}$ = −11.3908 | $d_{11}$ = (Variable) | | |
| $r_{12}$ = −10.1856 (Aspheric) | $d_{12}$ = 3.7369 | $n_{d6}$ = 1.84666 | $\nu_{d6}$ = 23.78 |
| $r_{13}$ = −10.1283 (Aspheric) | $d_{13}$ = 0.1550 | | |
| $r_{14}$ = −10.0505 (Aspheric) | $d_{14}$ = 0.8000 | $n_{d7}$ = 1.61800 | $\nu_{d7}$ = 63.33 |
| $r_{15}$ = −160.8158 | | | |

Zooming Spaces

| f | 38.900 | 76.100 | 145.150 |
|---|---|---|---|
| $d_4$ | 0.5000 | 6.1211 | 9.6928 |
| $d_{11}$ | 14.0868 | 7.1080 | 2.8567 |

-continued

| Example 1 |
|---|
| Aspherical Coefficients |

1st surface

K = 0
$A_4 = -2.7641 \times 10^{-4}$
$A_6 = -2.7527 \times 10^{-6}$
$A_8 = 2.9213 \times 10^{-8}$
$A_{10} = -4.1486 \times 10^{-11}$ 2nd surface K = 0
$A_4 = -2.7845 \times 10^{-4}$
$A_6 = -4.5362 \times 10^{-6}$
$A_8 = 4.2557 \times 10^{-8}$
$A_{10} = 4.0708 \times 10^{-10}$ 3rd surface K = 0
$A_4 = 8.7655 \times 10^{-5}$
$A_6 = -2.2755 \times 10^{-6}$
$A_8 = -3.4745 \times 10^{-8}$
$A_{10} = 1.2212 \times 10^{-9}$ 8th surface K = 0
$A_4 = 2.2493 \times 10^{-4}$
$A_6 = 3.2015 \times 10^{-6}$
$A_8 = -1.1378 \times 10^{-7}$
$A_{10} = 2.5730 \times 10^{-9}$ 12th surface K = 0
$A_4 = 1.2505 \times 10^{-4}$
$A_6 = 8.6413 \times 10^{-7}$
$A_8 = -4.7503 \times 10^{-9}$
$A_{10} = 5.9384 \times 10^{-11}$ 13th surface K = 0
$A_4 = 8.1073 \times 10^{-5}$
$A_6 = 3.4403 \times 10^{-6}$
$A_8 = -4.1582 \times 10^{-8}$
$A_{10} = 2.8978 \times 10^{-10}$ 14th surface K = 0
$A_4 = 6.2870 \times 10^{-5}$
$A_6 = 4.1130 \times 10^{-6}$
$A_8 = -5.1469 \times 10^{-8}$
$A_{10} = 3.5889 \times 10^{-10}$ Example 2

$f = 38.898 \sim 78.139 \sim 155.098$
$F_{NO} = 4.589 \sim 7.542 \sim 13.609$
$f_B = 8.177 \sim 33.771 \sim 82.414$

| | | | | |
|---|---|---|---|---|
| $r_1 = 22.0505$ (Aspheric) | $d_1 = 2.2530$ | | $n_{d1} = 1.72916$ | $\nu_{d1} = 54.68$ |
| $r_2 = 19.6191$ (Aspheric) | $d_2 = 0.5541$ | | | |
| $r_3 = 46.9047$ (Aspheric) | $d_3 = 2.7000$ | | $n_{d2} = 1.49700$ | $\nu_{d2} = 81.54$ |
| $r_4 = -26.7657$ | $d_4 = $ (Variable) | | | |
| $r_5 = -28.1703$ | $d_5 = 0.4400$ | | $n_{d3} = 1.76200$ | $\nu_{d3} = 40.10$ |
| $r_6 = 16.0985$ | $d_6 = 0.1000$ | | | |
| $r_7 = 11.5619$ | $d_7 = 3.5455$ | | $n_{d4} = 1.63930$ | $\nu_{d4} = 44.87$ |
| $r_8 = -238.6297$ (Aspheric) | $d_8 = 1.2367$ | | | |
| $r_9 = \infty$ (Stop) | $d_9 = 0.9307$ | | | |
| $r_{10} = -109.3895$ | $d_{10} = 1.6500$ | | $n_{d5} = 1.48749$ | $\nu_{d5} = 70.23$ |
| $r_{11} = -11.8348$ | $d_{11} = $ (Variable) | | | |
| $r_{12} = -9.8876$ (Aspheric) | $d_{12} = 4.2726$ | | $n_{d6} = 1.84666$ | $\nu_{d6} = 23.78$ |
| $r_{13} = -10.1416$ (Aspheric) | $d_{13} = 0.1550$ | | | |
| $r_{14} = -10.0610$ (Aspheric) | $d_{14} = 0.8000$ | | $n_{d7} = 1.61800$ | $\nu_{d7} = 63.33$ |
| $r_{15} = -145.2519$ | | | | |

-continued

| Example 2 |
|---|

Zooming Spaces

| | f | 38.898 | 78.139 | 155.098 |
|---|---|---|---|---|
| | $d_4$ | 0.5000 | 6.6003 | 10.4506 |
| | $d_{11}$ | 14.4267 | 7.0558 | 2.5154 |

Aspherical Coefficients

1st surface $K = 0$
$A_4 = -2.7665 \times 10^{-4}$
$A_6 = -2.7632 \times 10^{-6}$
$A_8 = 2.8716 \times 10^{-8}$
$A_{10} = -3.3721 \times 10^{-11}$ 2nd surface $K = 0$
$A_4 = -2.7828 \times 10^{-4}$
$A_6 = -4.5341 \times 10^{-6}$
$A_8 = 4.2504 \times 10^{-8}$
$A_{10} = 4.0492 \times 10^{-10}$ 3rd surface $K = 0$
$A_4 = 8.8737 \times 10^{-5}$
$A_6 = -2.2425 \times 10^{-6}$
$A_8 = -3.3979 \times 10^{-8}$
$A_{10} = 1.1953 \times 10^{-9}$ 8th surface $K = 0$
$A_4 = 1.9698 \times 10^{-4}$
$A_6 = 2.3291 \times 10^{-6}$
$A_8 = -6.7778 \times 10^{-8}$
$A_{10} = 1.3360 \times 10^{-9}$ 12th surface $K = 0$
$A_4 = 1.1832 \times 10^{-4}$
$A_6 = 1.0267 \times 10^{-6}$
$A_8 = -4.3020 \times 10^{-8}$
$A_{10} = 7.3191 \times 10^{-11}$ 13th surface $K = 0$
$A_4 = 6.8366 \times 10^{-5}$
$A_6 = 3.3461 \times 10^{-6}$
$A_8 = -4.0992 \times 10^{-8}$
$A_{10} = 2.9125 \times 10^{-10}$ 14th surface $K = 0$
$A_4 = 5.7940 \times 10^{-5}$
$A_6 = 4.0272 \times 10^{-6}$
$A_8 = -5.2717 \times 10^{-8}$
$A_{10} = 3.6941 \times 10^{-10}$

| Example 3 |
|---|

$f = 38.901 \sim 76.551 \sim 131.002$
$F_{NO} = 4.428 \sim 7.124 \sim 11.465$
$f_B = 7.098 \sim 33.594 \sim 70.341$

| | | | | |
|---|---|---|---|---|
| $r_1 = 20.3746$ (Aspheric) | $d_1 = 1.6728$ | $n_{d1} = 1.77250$ | $\nu_{d1} = 49.60$ |
| $r_2 = 18.4586$ (Aspheric) | $d_2 = 0.4358$ | | |
| $r_3 = 37.2888$ | $d_3 = 2.7000$ | $n_{d2} = 1.49700$ | $\nu_{d2} = 81.54$ |
| $r_4 = -37.7498$ (Aspheric) | $d_4 = $ (Variable) | | |
| $r_5 = -398.5106$ | $d_5 = 0.4090$ | $n_{d3} = 1.65412$ | $\nu_{d3} = 39.69$ |
| $r_6 = 11.4046$ | $d_6 = 0.1000$ | | |
| $r_7 = 9.2814$ | $d_7 = 3.9125$ | $n_{d4} = 1.63930$ | $\nu_{d4} = 44.87$ |
| $r_8 = 25.8398$ (Aspheric) | $d_8 = 1.0000$ | | |
| $r_9 = \infty$ (Stop) | $d_9 = 3.0367$ | | |
| $r_{10} = 843.7291$ | $d_{10} = 1.6500$ | $n_{d5} = 1.48749$ | $\nu_{d5} = 70.23$ |

-continued

Example 3

| | | | | | |
|---|---|---|---|---|---|
| $r_{11} =$ | −13.4647 | | $d_{11} =$ (Variable) | | |
| $r_{12} =$ | −10.5541 (Aspheric) | | $d_{12} = 5.1496$ | $n_{d8} = 1.84666$ | $\nu_{d6} = 23.78$ |
| $r_{13} =$ | −11.4487 (Aspheric) | | $d_{13} = 0.3550$ | | |
| $r_{14} =$ | −11.3599 (Aspheric) | | $d_{14} = 0.8000$ | $n_{d7} = 1.61800$ | $\nu_{d7} = 63.33$ |
| $r_{15} =$ | −76.8658 | | | | |

Zooming Spaces

| | | | |
|---|---|---|---|
| f | 38.901 | 76.551 | 131.002 |
| $d_4$ | 0.5000 | 7.5068 | 11.4921 |
| $d_{11}$ | 13.2658 | 4.7637 | 0.1659 |

Aspherical Coefficients

1st surface $K = 0$
$A_4 = -2.6734 \times 10^{-4}$
$A_6 = -2.9845 \times 10^{-6}$
$A_8 = 2.0759 \times 10^{-8}$
$A_{10} = 9.3091 \times 10^{-11}$ 2nd surface $K = 0$
$A_4 = -2.9397 \times 10^{-4}$
$A_6 = -3.9853 \times 10^{-6}$
$A_8 = 4.5130 \times 10^{-8}$
$A_{10} = 1.2380 \times 10^{-11}$ 4th surface $K = 0$
$A_4 = -4.4297 \times 10^{-5}$
$A_6 = 1.2643 \times 10^{-6}$
$A_8 = 3.7315 \times 10^{-9}$
$A_{10} = -2.7993 \times 10^{-10}$ 8th surface $K = 0$
$A_4 = 1.9748 \times 10^{-4}$
$A_6 = 2.7669 \times 10^{-6}$
$A_8 = -2.3551 \times 10^{-8}$
$A_{10} = 1.6178 \times 10^{-10}$ 12th surface $K = -0.0057$
$A_4 = 1.0379 \times 10^{-4}$
$A_6 = 1.4137 \times 10^{-6}$
$A_8 = -1.2929 \times 10^{-8}$
$A_{10} = 1.2333 \times 10^{-10}$ 13th surface $K = 0$
$A_4 = -1.7801 \times 10^{-5}$
$A_6 = 4.2294 \times 10^{-6}$
$A_8 = -4.5896 \times 10^{-8}$
$A_{10} = 2.2032 \times 10^{-10}$ 14th surface $K = 0$
$A_4 = -6.3210 \times 10^{-5}$
$A_6 = 5.3959 \times 10^{-6}$
$A_8 = -6.0427 \times 10^{-8}$
$A_{10} = 2.8507 \times 10^{-10}$

Example 4

$f = 38.900 \sim 78.150 \sim 164.001$
$F_{NO} = 4.471 \sim 7.364 \sim 14.419$
$f_B = 7.448 \sim 32.797 \sim 86.241$

| | | | | | |
|---|---|---|---|---|---|
| $r_1 =$ | 22.1708 (Aspheric) | | $d_1 = 2.2613$ | $n_{d1} = 1.72916$ | $\nu_{d1} = 54.68$ |
| $r_2 =$ | 18.6761 (Aspheric) | | $d_2 = 0.8323$ | | |
| $r_3 =$ | 36.7081 (Aspheric) | | $d_3 = 2.7000$ | $n_{d2} = 1.49700$ | $\nu_{d2} = 81.54$ |
| $r_4 =$ | −27.7685 | | $d_4 =$ (Variable) | | |
| $r_5 =$ | −69.9363 | | $d_5 = 0.4003$ | $n_{d3} = 1.76200$ | $\nu_{d3} = 40.10$ |

-continued

Example 4

| | | | | |
|---|---|---|---|---|
| $r_6 =$ | 14.6709 | $d_6 = 0.1000$ | | |
| $r_7 =$ | 10.6462 | $d_7 = 3.1974$ | $n_{d4} = 1.60562$ | $\nu_{d4} = 43.70$ |
| $r_8 =$ | 84.9682 (Aspheric) | $d_8 = 1.0000$ | | |
| $r_9 =$ | ∞ (Stop) | $d_9 = 1.9912$ | | |
| $r_{10} =$ | −91.8482 | $d_{10} = 1.6500$ | $n_{d5} = 1.49700$ | $\nu_{d5} = 81.54$ |
| $r_{11} =$ | −12.3515 | $d_{11} =$ (Variable) | | |
| $r_{12} =$ | −9.6745 (Aspheric) | $d_{12} = 5.0354$ | $n_{d6} = 1.84666$ | $\nu_{d6} = 23.78$ |
| $r_{13} =$ | −10.2618 (Aspheric) | $d_{13} = 0.1550$ | | |
| $r_{14} =$ | −10.1937 (Aspheric) | $d_{14} = 0.8000$ | $n_{d7} = 1.61800$ | $\nu_{d7} = 63.33$ |
| $r_{15} =$ | −132.9302 | | | |

Zooming Spaces

| f | 38.900 | 78.150 | 164.001 |
|---|---|---|---|
| $d_4$ | 0.5000 | 6.7265 | 11.0072 |
| $d_{11}$ | 13.4465 | 6.0676 | 1.1694 |

Aspherical Coefficients

1st surface $K = 0$
$A_4 = -2.7681 \times 10^{-4}$
$A_6 = -2.7538 \times 10^{-6}$
$A_8 = 2.9234 \times 10^{-8}$
$A_{10} = -3.9489 \times 10^{-11}$ 2nd surface $K = 0$
$A_4 = -2.7775 \times 10^{-4}$
$A_6 = -4.5147 \times 10^{-6}$
$A_8 = 4.2166 \times 10^{-8}$
$A_{10} = 2.9487 \times 10^{-10}$ 3rd surface $K = 0$
$A_4 = 9.1316 \times 10^{-5}$
$A_6 = -2.2087 \times 10^{-6}$
$A_8 = -3.4187 \times 10^{-8}$
$A_{10} = 1.0190 \times 10^{-9}$ 8th surface $K = 0$
$A_4 = 2.0947 \times 10^{-4}$
$A_6 = 2.1957 \times 10^{-6}$
$A_8 = -5.7366 \times 10^{-8}$
$A_{10} = 1.3931 \times 10^{-9}$ 12th surface $K = 0$
$A_4 = 1.1958 \times 10^{-4}$
$A_6 = 6.9693 \times 10^{-7}$
$A_8 = 1.0910 \times 10^{-8}$
$A_{10} = -4.4922 \times 10^{-11}$ 13th surface $K = 0$
$A_4 = 3.6135 \times 10^{-5}$
$A_6 = 3.1210 \times 10^{-6}$
$A_8 = -3.9286 \times 10^{-8}$
$A_{10} = 3.0345 \times 10^{-10}$ 14th surface $K = 0$
$A_4 = 1.7310 \times 10^{-5}$
$A_6 = 3.9862 \times 10^{-6}$
$A_8 = -5.4764 \times 10^{-8}$
$A_{10} = 4.0362 \times 10^{-10}$

Example 5

$f = 38.932 \sim 76.097 \sim 150.357$
$F_{NO} = 4.870 \sim 7.831 \sim 13.178$
$f_B = 8.038 \sim 33.561 \sim 82.493$

| | | | | |
|---|---|---|---|---|
| $r_1 =$ | 21.8710 (Aspheric) | $d_1 = 2.5000$ | $n_{d1} = 1.77250$ | $\nu_{d1} = 49.60$ |
| $r_2 =$ | 18.2009 (Aspheric) | $d_2 = 0.7697$ | | |

-continued

Example 5

| | | | |
|---|---|---|---|
| $r_3 =$ 93.5382 (Aspheric) | $d_3 = 2.7000$ | $n_{d2} = 1.49700$ | $v_{d2} = 81.54$ |
| $r_4 =$ −21.3471 | $d_4 =$ (Variable) | | |
| $r_5 =$ −161.6639 (Aspheric) | $d_5 = 0.8119$ | $n_{d3} = 1.80440$ | $v_{d3} = 39.59$ |
| $r_6 =$ 15.8782 | $d_6 = 0.2000$ | | |
| $r_7 =$ 8.5240 (Aspheric) | $d_7 = 1.7252$ | $n_{d4} = 1.63930$ | $v_{d4} = 44.87$ |
| $r_8 =$ 17.0744 (Aspheric) | $d_8 = 1.2500$ | | |
| $r_9 = \infty$ (Stop) | $d_9 = 0.8500$ | | |
| $r_{10} =$ −34.6814 | $d_{10} = 1.6500$ | $n_{d5} = 1.48749$ | $v_{d5} = 70.23$ |
| $r_{11} =$ −9.1570 (Aspheric) | $d_{11} =$ (Variable) | | |
| $r_{12} =$ −10.3401 (Aspheric) | $d_{12} = 4.6239$ | $n_{d6} = 1.84666$ | $v_{d6} = 23.78$ |
| $r_{13} =$ −10.7186 (Aspheric) | $d_{13} = 0.3227$ | | |
| $r_{14} =$ −10.6282 (Aspheric) | $d_{14} = 0.8000$ | $n_{d7} = 1.61800$ | $v_{d7} = 63.33$ |
| $r_{15} =$ −104.3699 | | | |

Zooming Spaces

| f | 38.932 | 76.097 | 150.357 |
|---|---|---|---|
| $d_4$ | 1.1008 | 7.9775 | 12.7410 |
| $d_{11}$ | 14.2953 | 6.6833 | 1.7000 |

Aspherical Coefficients

1st surface $K = 0$
$A_4 = -2.6828 \times 10^{-4}$
$A_6 = -2.7784 \times 10^{-6}$
$A_8 = 3.0856 \times 10^{-8}$
$A_{10} = -5.4288 \times 10^{-11}$ 2nd surface $K = 0$
$A_4 = -2.8196 \times 10^{-4}$
$A_6 = -4.5592 \times 10^{-6}$
$A_8 = 4.5363 \times 10^{-8}$
$A_{10} = 3.8861 \times 10^{-10}$ 3rd surface $K = 0$
$A_4 = 8.1767 \times 10^{-5}$
$A_6 = -2.3363 \times 10^{-6}$
$A_8 = -3.9956 \times 10^{-8}$
$A_{10} = 1.3158 \times 10^{-9}$ 5th surface $K = 0$
$A_4 = -2.0608 \times 10^{-5}$
$A_6 = -5.5658 \times 10^{-7}$
$A_8 = 1.0980 \times 10^{-8}$
$A_{10} = -1.4641 \times 10^{-10}$ 7th surface $K = 0$
$A_4 = 2.3382 \times 10^{-4}$
$A_6 = 7.9938 \times 10^{-6}$
$A_8 = -2.3778 \times 10^{-7}$
$A_{10} = -7.5782 \times 10^{-9}$ 8th surface $K = 0$
$A_4 = 7.0015 \times 10^{-4}$
$A_6 = 1.8503 \times 10^{-5}$
$A_8 = -3.6008 \times 10^{-7}$
$A_{10} = -1.1392 \times 10^{-8}$ 11th surface $K = 0$
$A_4 = -8.0786 \times 10^{-5}$
$A_6 = -2.7985 \times 10^{-6}$
$A_8 = -5.0376 \times 10^{-8}$
$A_{10} = 1.3566 \times 10^{-9}$ 12th surface $K = 0$
$A_4 = 9.9546 \times 10^{-5}$
$A_6 = 1.6996 \times 10^{-6}$
$A_8 = -1.9184 \times 10^{-8}$
$A_{10} = 1.6484 \times 10^{-10}$ -continued

Example 5

13th surface

K = 0
$A_4$ = 5.8832 × 10$^{-5}$
$A_6$ = 2.9730 × 10$^{-6}$
$A_8$ = −4.1790 × 10$^{-8}$
$A_{10}$ = 2.7766 × 10$^{-10}$

14th surface

K = 0
$A_4$ = 4.9265 × 10$^{-5}$
$A_6$ = 3.3879 × 10$^{-6}$
$A_8$ = −5.2267 × 10$^{-8}$
$A_{10}$ = 3.5031 × 10$^{-10}$

Set out below are the values for conditions (1) to (3) in Examples 1 to 5.

| | $D_{2W}/d_1$ | $|f_3|/f_T$ | $\beta_{3T}/\beta_{3W}$ |
|---|---|---|---|
| Example 1 | 0.326 | 0.131 | 3.221 |
| Example 2 | 0.333 | 0.120 | 3.400 |
| Example 3 | 0.307 | 0.166 | 2.850 |
| Example 4 | 0.311 | 0.112 | 3.564 |
| Example 5 | 0.330 | 0.135 | 3.257 |

The telephoto ratios in Examples 1 to 5 are also set out below.

| | |
|---|---|
| Example 1 | 0.764 |
| Example 2 | 0.735 |
| Example 3 | 0.788 |
| Example 4 | 0.723 |
| Example 5 | 0.766 |

The values of $D_{2W}/d_1$, $|f_3|/f_T$ and $\beta_{3T}/\beta_{3W}$ shown in the above table come within the following respective ranges. As a matter of course, the above exemplified zoom lens systems satisfy conditions (1) to (3); they have a reduced telephoto ratio at the telephoto end albeit having a high zoom ratio, and are relatively simple in lens arrangement, reduced in size during collapsing and well corrected for aberrations.

$0.30 < D_{2W}/d_1 < 0.35$
$0.10 < |f_3|/f_T < 0.18$
$2.7 < \beta_{3T}/\beta_{3W} < 3.7$ The set of a positive lens and a negative lens in the first to third lens groups G1 to G3 includes an air-spaced or non-cemented doublet consisting of two lenses with a slight air space between them, and a cemented doublet consisting of two lenses brought in physical contact with each other by means of an adhesive agent or the like. Which type is selected depends on the whole lens arrangement of the zoom lens system, balances of correction of aberrations, decentration errors and sensitivity, etc.

The zoom lens system according to the present invention is of the type that the magnification changes continuously from the wide-angle end to the telephoto end. However, it is noted that the present invention may also be applied to a zoom lens system of the type that it has varied magnifications at its wide-angle end and telephoto end positions or its wide-angle end, intermediate and telephoto end positions.

The radius of curvature of the object-side concave surface of the object side-meniscus lens in the third lens group G3 in each example is so small that when the second and third lens groups G2 and G3 are closest to each other, the apex of the surface of the lens located nearest to the object side in the second lens group G2 is positioned closer to the image side than to the peripheral portion of the lens located nearest to the object side in the third lens group G3 (a position where a chamfered surface intersects a spherical surface). Accordingly, the lens located nearest to the image side in the second lens group G2 can move in a space defined by this concave surface. As a result, not only can the length of the lens system at the telephoto end be reduced but also the size of the camera during lens collapsing can be reduced.

The thickness on the optical axis of the meniscus lens in the third lens group G3 is about 4.5 to about 6.5 times larger than that of the negative lens.

The zoom lens system of the present invention has a zoom ratio of 3 or greater and a telephoto ratio of about 0.7. The zoom lens systems exemplified herein have a zoom ratio of 3.3 to 4.2 and a telephoto ratio of 0.72 to 0.79.

As can be understood from the foregoing explanations and according to the present invention, of solutions to three-group zoom lens systems of ++− refracting power profile in order from the object side, a proper solution is found, which ensures a proper refracting power profile where the amount of zooming movement from the wide-angle end to the telephoto end is reduced while high magnifications are maintained. Correction of aberrations is ensured with a simple yet proper lens arrangement by making effective use of spherical surfaces.

What is claimed is:

1. A zoom lens system comprising, in order from an object side thereof, a first lens group having positive refracting power, a second lens group having positive refracting power and a third lens group having negative refracting power, wherein:

for zooming from a wide-angle end to a telephoto end of said system, each lens group moves toward said object side while a spacing between said first lens group and said second lens group becomes wide and a spacing between said second lens group and said third lens group becomes narrow, said first lens group comprises at least one set of a negative lens and a positive lens, said second lens group includes an aperture stop and comprises at least one set of a negative lens and a positive lens, said third lens group comprises one set of a positive lens and a negative lens, and conditions (1), (2) and (3) are satisfied:

$$0.25 < D_{2W}/d_1 < 0.6 \quad (1)$$

$$0.03 < |f_3|/f_T < 0.25 \quad (2)$$

$$2.0 < \beta_{3T}/\beta_{3W} < 6.0 \quad (3)$$

where $D_{2W}$ is an actual air space between said second lens group and said third lens group at said wide-angle end, $d_1$ is a diagonal line length of an image plane of said zoom lens system that is a film or a diameter of an image circle, $f_3$ is a focal length of said third lens group, $f_T$ is a focal length of said zoom lens system at said telephoto end, $\beta_{3T}$ is a transverse magnification of said third lens group at said telephoto end, and $\beta_{3W}$ is a transverse magnification of said third lens group at said wide-angle end.

2. The zoom lens system according to claim 1, wherein the first lens group consists of, in order from the object side of the system, one negative lens having reduced refracting power and one positive lens, the second lens group consists of, in order from the object side, one negative lens, a positive lens having a strong curvature on an object side thereof, an aperture stop and one positive lens having a strong curvature on an image side thereof, and the third lens group consists of one positive lens convex on an image side thereof and one negative lens strongly concave on an object side thereof.

3. The zoom lens system according to claim 1, wherein lenses that forms the first lens group having positive refracting power have at least two aspherical surfaces so as to make correction for spherical aberration in at least a telephoto region of the zoom lens system.

4. The zoom lens system according to claim 1, wherein a positive lens or a negative lens that forms a part of the second lens group having positive refracting power has at least one aspherical surface so as to make correction for at least off-axis aberrations.

5. The zoom lens system according to claim 1, wherein a negative lens that forms a part of the third lens group having negative refracting power has an aspherical surface on a strong concave surface thereof on an object side thereof so as to make correction for a peripheral image plane in at least a wide-angle region of the zoom lens system.

6. The zoom lens system according to claim 1, wherein a positive lens that forms a part of the third lens group has at least two aspherical surfaces on its surface strongly concave on its image side so as to make correction for a peripheral image plane in at least a wide-angle region of the zoom lens system.

7. The zoom lens system according to claim 1, wherein said lens group includes lenses having concave surfaces opposite to each other with said aperture stop located therebetween.

8. The zoom lens system according to claim 1, which has a zoom ratio of 3.5 or greater and a telephoto end of 0.8 or less.

9. The zoom lens system according to claim 1, wherein peripheral portions of lenses in said third lens group are contiguous to one another.

10. A zoom lens system comprising, in order from an object side theref, a first lens group having positive refracting power, a second lens group having positive refracting power and a third lens group having negative refracting power, wherein:

for zooming from a wide-angle end to a telephoto end of said system, each lens group moves toward said object side while a spacing between said first lens group and said second lens group becomes wide and a spacing between said second lens group and said third lens group becomes narrow, said zoom lens system having a zoom ratio of 3 or greater and a telephoto ratio of approximately 0.7.

11. A zoom lens system comprising, in order from an object side thereof, a first lens group having positive refracting power, a second lens group having positive refracting power and a third lens group having negative refracting power, wherein:

for zooming from a wide-angle end to a telephoto end of said system, each lens group moves toward said object side while a spacing between said first lens group and said second lens group becomes wide and a spacing between said second lens group and said third lens group becomes narrow, an object side-surface of a lens located nearest to said object side in said third lens group is strongly concave on said object side, and when said second lens group and said third lens group are closest to each other, an apex of a lens surface located nearest to an image side in said second lens group is positioned closer to said image side than to a peripheral portion of said lens having a strong concave surface on said object side.

12. A zoom lens system comprising, in order from an object side thereof, a first lens group having positive refracting power, a second lens group having positive refracting power and a third lens group having negative refracting power, wherein:

for zooming from a wide-angle end to a telephoto end of said system, each lens group moves toward said object side while a spacing between said first lens group and said second lens group becomes wide and a spacing between said second lens group and said third lens group becomes narrow, said third lens group comprises a meniscus lens and a negative lens in order from said object side, said meniscus lens has an axial thickness larger than that of said negative lens, wherein the axial thickness of said meniscus lens in said third lens group is 4.6 to 6.5 times as large as that of said negative lens.

* * * * *